United States Patent
Park et al.

(10) Patent No.: US 10,003,808 B2
(45) Date of Patent: Jun. 19, 2018

(54) APPARATUS AND METHOD FOR ENCODING

(71) Applicant: ELECTRONICS AND TELECOMMUNICATIONS RESEARCH INSTITUTE, Daejeon (KR)

(72) Inventors: Seong-Mo Park, Daejeon (KR); Kyung-Jin Byun, Daejeon (KR); Nak-Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 529 days.

(21) Appl. No.: 14/722,916

(22) Filed: May 27, 2015

(65) Prior Publication Data

US 2016/0057435 A1 Feb. 25, 2016

(30) Foreign Application Priority Data

Aug. 20, 2014 (KR) .................. 10-2014-0108642

(51) Int. Cl.
*H04N 7/12* (2006.01)
*H04N 19/176* (2014.01)
(Continued)

(52) U.S. Cl.
CPC ......... *H04N 19/176* (2014.11); *H04N 19/103* (2014.11); *H04N 19/157* (2014.11)

(58) Field of Classification Search
CPC ... H04N 19/176; H04N 19/157; H04N 19/103
(Continued)

(56) References Cited

U.S. PATENT DOCUMENTS 8,194,736 B2 * 6/2012 Youn .................... H04N 19/176
370/451
9,503,722 B2 * 11/2016 Chen et al. ............ H04N 19/13
(Continued)

FOREIGN PATENT DOCUMENTS

KR 10-2002-0085217 A 11/2002
KR 10-2013-0004173 A 1/2013
(Continued)

OTHER PUBLICATIONS

Yuri V. Ivanov et al., "Reference Frame Compression using Embedded Reconstruction Patterns for H.264/AVC Decoder" The Third International Conference on Digital Telecommunications, pp. 168-173, 2008.

*Primary Examiner* — Mohammed Rahaman
*Assistant Examiner* — Richard Carter
(74) *Attorney, Agent, or Firm* — Rabin & Berdo, P.C.

(57) ABSTRACT

An encoding apparatus in accordance with an embodiment of the present invention includes: an encoder configured to request for storage of an original frame; a frame processing unit configured to generate an encoded frame having the original framed encoded therein; and a frame memory configured to store the encoded frame. Here, the frame processing unit is configured to generate the original frame by encoding the encoded frame stored in the frame memory according to a request of the encoder, and the encoder is configured to perform encoding according to the original frame.

14 Claims, 7 Drawing Sheets

(51) Int. Cl.
*H04N 19/103* (2014.01)
*H04N 19/157* (2014.01)

(58) Field of Classification Search
USPC .................. 375/240.12, 240.13; 370/451
See application file for complete search history.

(56) References Cited

U.S. PATENT DOCUMENTS

| | | | |
|---|---|---|---|
| 2011/0317763 A1* | 12/2011 | Takada | H04N 19/436 375/240.13 |
| 2013/0170548 A1* | 7/2013 | Aoki | H04N 19/70 375/240.12 |
| 2013/0170552 A1 | 7/2013 | Kim et al. | |
| 2014/0126645 A1 | 5/2014 | Lim et al. | |

FOREIGN PATENT DOCUMENTS

| | | |
|---|---|---|
| KR | 10-2013-0080324 A | 7/2013 |
| WO | WO-2013-005966 A2 | 1/2013 |

\* cited by examiner $a = (A+B+1)/2$
$b = (A+C+1)/2$
$c = (a+b+1)/2$

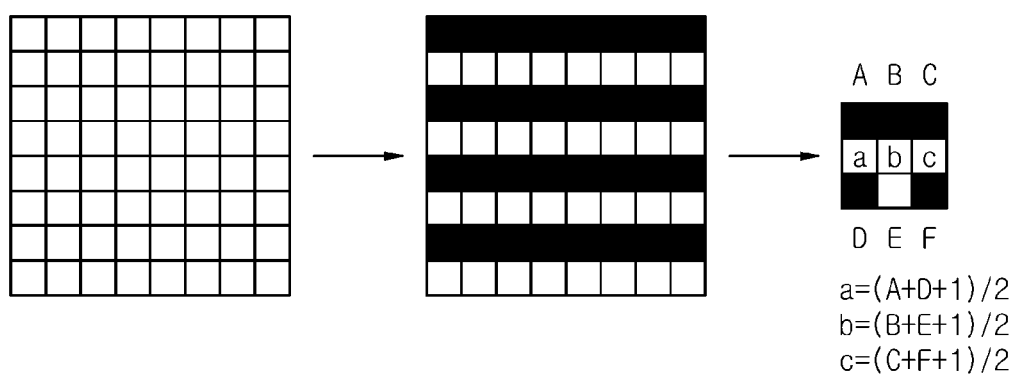
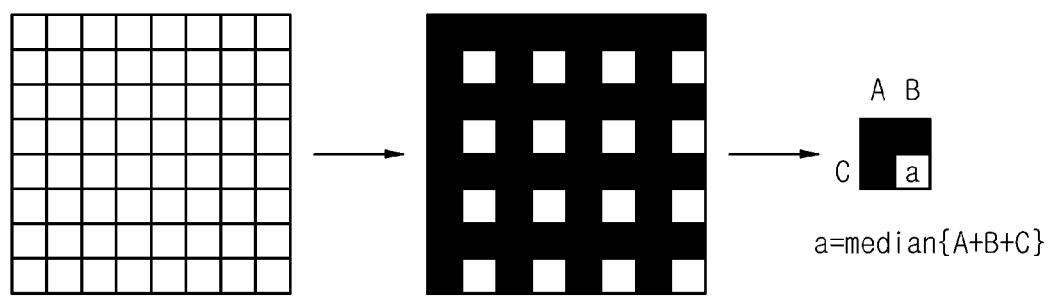

APPARATUS AND METHOD FOR ENCODING

CROSS-REFERENCE TO RELATED APPLICATIONS

This application claims the benefit of Korean Patent Application No. 10-2014-0108642, filed with the Korean Intellectual Property Office on Aug. 20, 2014, the disclosure of which is incorporated herein by reference in its entirety.

BACKGROUND

1. Technical Field

The present invention relates to encoding video, more specifically to encoding frames that are stored in a frame memory.

2. Background Art

HEVC (High Efficiency Video Coding) is an MPEG standard targeted for a compression ratio that is twice of the H.264 compression ratio. With the main technical objective of achieving a very high compression ratio, HEVC is a general purpose video encoding technology that can be used in nearly every transmission medium, such as storage media, internet and satellite broadcasting, and for various video resolutions and can easily compress high-resolution images. As video resolutions have been increasing recently, the markets today require an SoC (System on Chip) that can process Ultra High Definition resolutions.

As picture qualities reach ultra-high resolutions, there are increased frequencies of data communication between an external memory and an internal memory when a video codec is developed using the system semiconductor. Accordingly, the memory bandwidth problem becomes more serious with the increased resolution, deteriorating the performance of the whole system. Studied to solve this problem is a frame coding technology in which coded frames are stored when data is read or written in the external memory in the video codec.

In the conventional technology, the frame memory has been compressed using a lossy compression algorithm if more than a predetermined number of bits are generated during the coding, and a lossless compression algorithm if the generated bits are not more than the predetermined number. This method, however, has the problems of deteriorated picture quality due to the use of the lossy compression algorithm and increased power consumption due to the heavy hardware use because of the implementation using both the lossless compression algorithm and the lossy compression algorithm.

SUMMARY

The present invention provides an apparatus for coding that adaptively codes frames being stored in a frame memory according to depth information of surrounding coding units.

An aspect of the present invention provides an encoding apparatus, which includes: an encoder configured to request for storage of an original frame; a frame processing unit configured to generate an encoded frame having the original framed encoded therein; and a frame memory configured to store the encoded frame. Here, the frame processing unit is configured to generate the original frame by encoding the encoded frame stored in the frame memory according to a request of the encoder, and the encoder is configured to perform encoding according to the original frame.

The frame processing unit may include: an internal memory configured to store the original frame; a compressor configured to generate encoded codes by encoding the original frame; a duplicate date encoder configured to generate duplicate removed codes by removing duplicate encoded codes among the encoded codes; a packer configured to generate an encoded frame having the duplicate removed codes combined therein and store the encoded frame in the frame memory; an unpacker configured to receive the encoded frame from the frame memory and extract the duplicate removed codes included in the encoded frame; a duplicate data decoder configured to generate the encoded codes by converting the duplicate removed codes; and a decompressor configured to generate the original frame by decoding the encoded codes and store the original frame in the internal memory.

The compressor may be configured to select a prediction method of a target coding unit according to depth information of surrounding coding units of the original frame, and the compressor may be configured to encode pixels included in the target coding unit according to the prediction method.

The compressor may be configured to encode each pixel included in the target coding unit through a first prediction method in case the depth information of all of the surrounding coding units is 0. The encoding according to the first prediction method may be performed by deleting pixels except upper left pixels in each block when the target coding unit is divided into 2×2 blocks. The decompressor may be configured to decode each pixel included in the target coding unit through the first prediction method in case the depth information of all of the surrounding coding units is 0. In case pixels adjacent to the deleted pixel on the left and right sides or upper and lower sides thereof are remaining pixels, the decoding according to the first prediction method may be performed by adding 1 to values of the remaining pixels and dividing this sum into 2. In case pixels adjacent to each deleted pixel on the upper and left sides thereof are deleted pixels, the decoding according to the first prediction method may be performed by adding 1 to values of the deleted pixels on the upper and left sides and dividing this sum into 2.

The compressor may be configured to encode each pixel included in the target coding unit through a second prediction method in case the depth information of all of the surrounding coding units is 1. The encoding according to the second prediction method may be performed by deleting pixels except upper left pixels and upper right pixels in each block when the target coding unit is divided into 2×2 blocks. The decompressor may be configured to decode each pixel included in the target coding unit through the second prediction method in case the depth information of all of the surrounding coding units is 1. The decoding according to the second prediction method may be performed by adding 1 to values of pixels adjacent to the deleted pixels on the upper and lower sides thereof and dividing this sum into 2.

The compressor may be configured to encode each pixel included in the target coding unit through a third prediction method in case the depth information of not all of the surrounding coding units is 0 or the depth information of not all of the surrounding coding units is 1. The encoding according to the third prediction method may be performed by deleting a lower right pixel of each block when the target coding unit is divided into 2×2 blocks. The decompressor may be configured to decode each pixel included in the target coding unit through the third prediction method in case the depth information of not all of the surrounding coding units is 0 or the depth information of not all of the surrounding coding units is 1. The decoding according to the third prediction method may be performed by taking a median value of remaining pixels adjacent to the deleted pixel on the left, upper and upper left sides thereof.

The duplicate data encoder may be configured to sort the encoded code into a 2×2 group according to a position of a pixel corresponding to the encoded code. The duplicate data encoder may include a comparator configured to output a flag indicating an identicalness between encoded codes included in the group. The duplicate data encoder may be configured to generate the duplicate removed code by combining one of identical encoded codes within the group, un-identical encoded code(s) within the group and the flag.

The duplicate data decoder may be configured to assign each encoded code included in the duplicate removed code to a pixel corresponding to the group according to the flag of the duplicate removed code.

Another aspect of the present invention provides a method for encoding a video by an encoding apparatus that includes: receiving an original frame into an internal memory; generating an encoded frame by encoding the original frame; storing the original frame in a frame memory; generating the original frame by decoding the encoded frame stored in the frame memory; and performing encoding according to the original frame.

The generating of the encoded frame by encoding the original frame may include: generating encoded codes by encoding the original frame; generating duplicate removed codes by removing duplicate encoded codes among the encoded codes; and generating an encoded frame having the duplicate removed codes combined therein and storing the encoded frame in the frame memory, and the generating of the original frame by decoding the encoded frame stored in the frame memory may include: extracting the duplicate removed codes included in the encoded frame stored in the frame memory; generating the encoded codes by converting the duplicate removed codes; and generating the original frame by decoding the encoded codes.

The generating of the original frame by decoding the encoded codes may include: selecting a prediction method of a target coding unit according to depth information of surrounding coding units of the original frame; and encoding pixels included in the target coding unit according to the prediction method.

In the selecting of a prediction method of a target coding unit according to depth information of surrounding coding units of the original frame, each pixel included in the target coding unit may be encoded through a first prediction method in case the depth information of all of the surrounding coding units is 0. The encoding according to the first prediction method may be performed by deleting pixels except upper left pixels in each block when the target coding unit is divided into 2×2 blocks. In the generating of the original frame by decoding the encoded codes, each pixel included in the target coding unit may be decoded through the first prediction method in case the depth information of all of the surrounding coding units is 0. In case pixels adjacent to the deleted pixel on the left and right sides or upper and lower sides thereof are remaining pixels, the decoding according to the first prediction method may be performed by adding 1 to values of the remaining pixels and dividing this sum into 2. In case pixels adjacent to each deleted pixel on the upper and left sides thereof are deleted pixels, the decoding according to the first prediction method may be performed by adding 1 to values of the deleted pixels on the upper and left sides and dividing this sum into 2.

In the selecting of a prediction method of a target coding unit according to depth information of surrounding coding units of the original frame, each pixel included in the target coding unit may be encoded through a second prediction method in case the depth information of all of the surrounding coding units is 1. The encoding according to the second prediction method may be performed by deleting pixels except upper left pixels and upper right pixels in each block when the target coding unit is divided into 2×2 blocks. In the generating of the original frame by decoding the encoded codes, each pixel included in the target coding unit may be decoded through the second prediction method in case the depth information of all of the surrounding coding units is 1. The decoding according to the second prediction method may be performed by adding 1 to values of pixels adjacent to the deleted pixels on the upper and lower sides thereof and dividing this sum into 2.

In the selecting of a prediction method of a target coding unit according to depth information of surrounding coding units of the original frame, each pixel included in the target coding unit may be encoded through a third prediction method in case the depth information of not all of the surrounding coding units is 0 or the depth information of not all of the surrounding coding units is 1. The encoding according to the third prediction method may be performed by deleting a lower right pixel of each block when the target coding unit is divided into 2×2 blocks. In the generating of the original frame by decoding the encoded codes, each pixel included in the target coding unit may be decoded through the third prediction method in the depth information of not all of the surrounding coding units is 0 or the depth information of not all of the surrounding coding units is 1. The decoding according to the third prediction method may be performed by taking a median value of remaining pixels adjacent to the deleted pixel on the left, upper and upper left sides thereof.

The generating of the duplicate removed codes by removing the duplicate encoded codes among the encoded codes may include: sorting the encoded code into a 2×2 group according to a position of a pixel corresponding to the encoded code, and generating a flag indicating an identicalness between encoded codes included in the group; and generating the duplicate removed code by combining one of identical encoded codes within the group, un-identical encoded code(s) within the group and the flag.

In the generating of the encoded codes by converting the duplicate removed codes, each encoded code included in the duplicate removed code may be assigned to a pixel corresponding to the group according the flag of the duplicate removed code.

By adaptively applying a compression algorithm with the depth information of surrounding coding units, the present invention can have a better image quality than using a lossy compression algorithm and lower the complexity of calculation required for encoding and decoding.

By lowering the complexity of calculation required for encoding and decoding, the present invention can realize a frame processing unit with a small area of hardware.

BRIEF DESCRIPTION OF DRAWINGS

FIG. 6 illustrates a second prediction method performed by the encoding apparatus in accordance with an embodiment of the present invention.

FIG. 7 illustrates a third prediction method performed by the encoding apparatus in accordance with an embodiment of the present invention.

DETAILED DESCRIPTION

Figure 1:
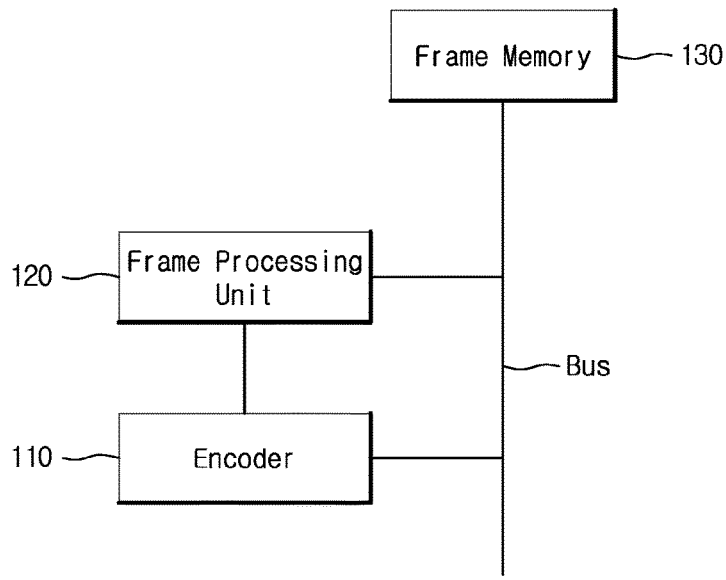
FIG. 1 illustrates an encoding apparatus including a frame processing unit in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain technology is determined to evade the point of the present invention, the pertinent detailed description will be omitted. Numerals (e.g., first, second, etc.) used in the description of the present invention are only for distinguishing one element from another element.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description of the present invention, when describing a certain technology is determined to evade the point of the present invention, the pertinent detailed description will be omitted.

FIG. 1 illustrates an encoding apparatus in accordance with an embodiment of the present invention.

Referring to FIG. 1, the encoding apparatus in accordance with an embodiment of the present invention includes an encoder 110, a frame processing unit 120 and a frame memory 130.

The encoder 110 encodes each frame through a known method. Here, the encoder 110 may obtain each frame according to an internal memory provided in the frame processing unit 120. Moreover, the encoder 110 stores a frame to be stored in the frame memory 130 in the internal memory of the frame processing unit 120.

The frame processing unit 120 encodes the frame received in the internal memory from the encoder 110 and stores the frame in the frame memory 130. Moreover, in case the frame processing unit 120 is requested for a decoded frame from the encoder 110, the frame processing unit 120 decodes the encoded frame stored in the frame memory 130 and stores the decoded frame in the internal memory. Accordingly, by storing the frame in the internal memory of the frame processing unit 120, the encoder 110 may decode the pertinent frame and store in the frame memory 130. Moreover, the encoder 110 may obtain the decoded frame according to the internal memory.

The frame memory 130 stores the frame encoded by the frame processing unit 120. Here, the frame memory 130 and the frame processing unit 120 may be connected through a bus.

Figure 2:
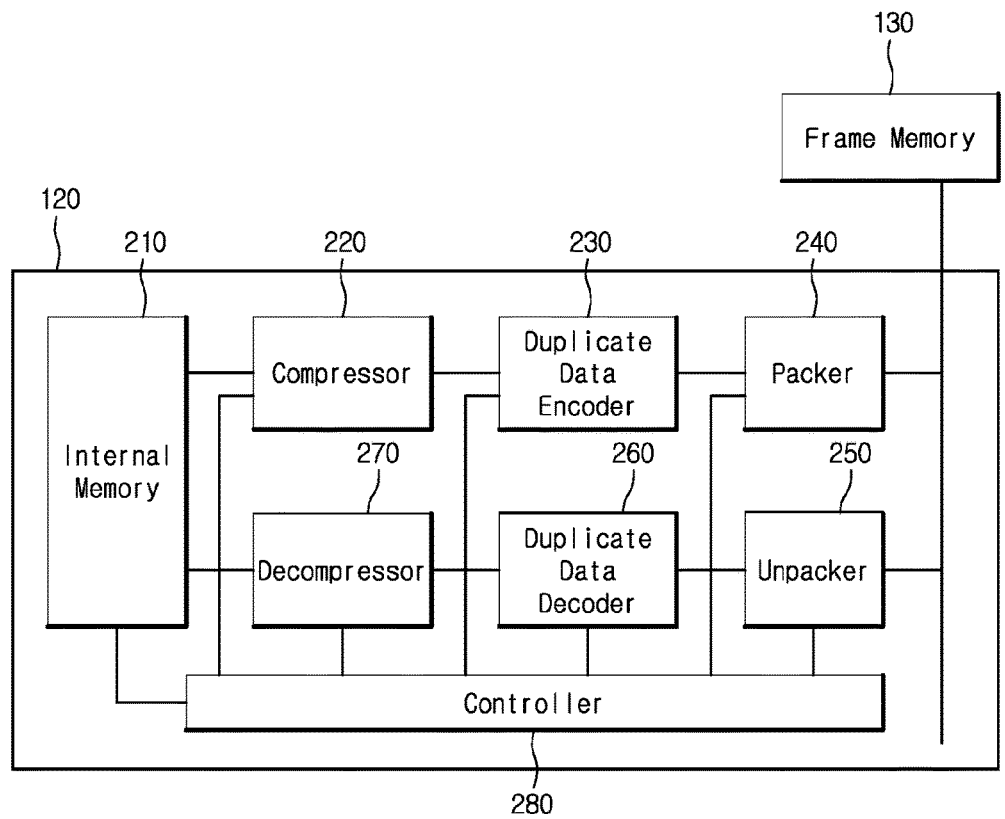
FIG. 2 is a block diagram illustrating the frame processing of the encoding apparatus in accordance with an embodiment of the present invention.

FIG. 2 is a block diagram illustrating the frame processing of the encoding apparatus in accordance with an embodiment of the present invention.

Referring to FIG. 2, the frame processing unit 120 includes an internal memory 210, a compressor 220, a duplicate data encoder 230, a packer 240, an unpacker 250, a duplicate data decoder 260, a decompressor 270 and a controller 280.

The internal memory 210 stores a de-encoded frame (referred to as "original frame" hereinafter). The compressor 220 and the encoder 110 may access the internal memory 210 to read the original frame, and the decompressor 270 and the encoder 110 may access the internal memory 210 to store the original frame.

The compressor 220 encodes the original frame stored in the internal memory 210. Here, the compressor 220 encodes the original frame in coding units. In encoding each coding unit, the compressor 220 selects a prediction method for each coding unit according to depth information of surrounding coding units. Each of the prediction methods and the steps for selecting the prediction method will be described later in detail with reference to FIG. 3 to FIG. 7. The compressor 220 encodes each pixel value of the coding unit based on the selected prediction method. The compressor 220 sends an encoded value (referred to as "encoded code" hereinafter) to the duplicate data encoder 230.

The duplicate date encoder 230 generates data (referred to as "duplicate removed code" hereinafter) that includes, when the frame is divided into blocks having a predetermined size (e.g., 2×2 block), encoded codes of pixels having a same encoded code among the pixels included in the same block and flags representing the pixels having the same encoded code among the pixels included in the same block. The duplicate data encoder 230 sends the duplicate removed code to the packer 240. The steps for having the duplicate removed code generated by the duplicate data encoder 230 will be described later in detail with reference to FIG. 8 and FIG. 9.

The packer 240 generates a encoded frame, which is data consolidated with duplicate removed codes received from the duplicate data encoder 230, and store the encoded frame in the frame memory 130. In other words, the encoded frame may be data to which the original frame is encoded through the compressor 220 and the duplicate data encoder 110.

Accordingly, the encoding apparatus in accordance with an embodiment of the present invention may encode and store frames requiring temporary storage in the frame memory while the encoder 110 is engaged in encoding. Here, since the encoded frame is stored or read in the frame memory 130, rather than the original frame, the problem of memory bandwidth may be solved.

The unpacker 250 extracts a predetermined number of adjacent pixel units of duplicate removed codes from the encoded frame stored in the frame memory 130 and sends the extracted duplicate removed codes to the duplicate data decoder 260.

The duplicate date decoder 260 checks for pixels having a same encoded code based on the flags included in the duplicate removed code per block, and assigns the encoded code included in the duplicate removed code as the encoded code of the pertinent pixels. The duplicate date decoder 260 sends the encoded code for each pixel to the decompressor 270.

The decompressor 270 calculates a prediction value for one or more pixels of each coding unit, and recovers the frame by taking the prediction value as the pixel value. Here, like the compressor 220, the decompressor 270 may select a prediction method for each coding unit according to depth information of surrounding coding units. Each of the prediction methods and the steps for selecting the prediction method will be described later in detail with reference to FIG. 3 to FIG. 7. The decompressor 270 stores the original frame including each pixel value in the internal memory 210.

The controller 280 controls operations of the above-described units. For example, in case the decoded frame is requested by the encoder, the controller 280 may control the unpacker 260, the duplicate data decoder 260 and the decompressor to allow the original frame to be stored in the internal memory 210. Moreover, in case storage of the original frame is requested by the encoder 110, the controller 280 may control the compressor 220, the duplicate date encoder 230 and the packer 240 to allow the encoded frame to be stored in the frame memory 130.

Figure 3:
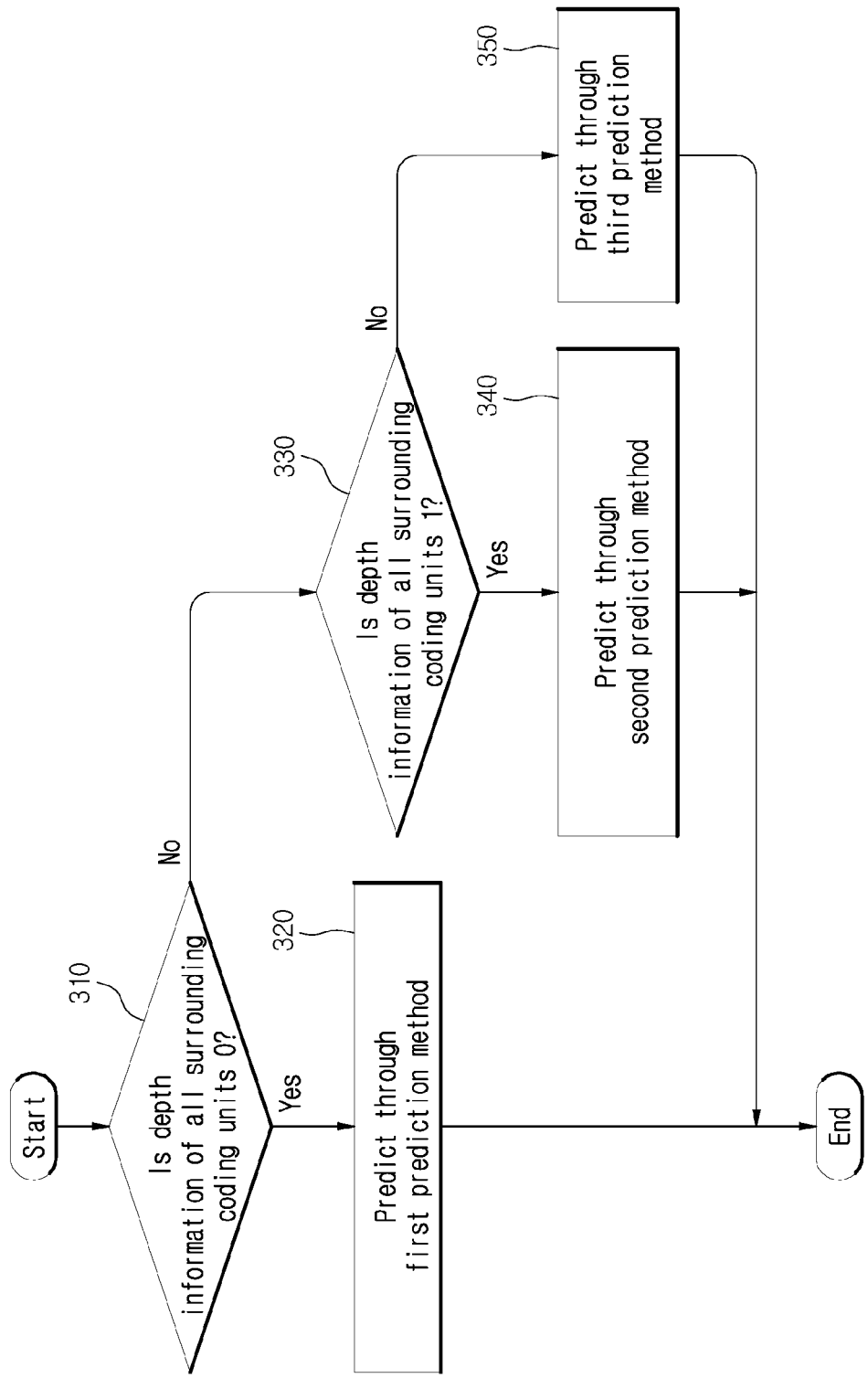
FIG. 3 illustrates how a compressor and a decompressor of the encoding apparatus select a prediction method in accordance with an embodiment of the present invention.
Figure 4:
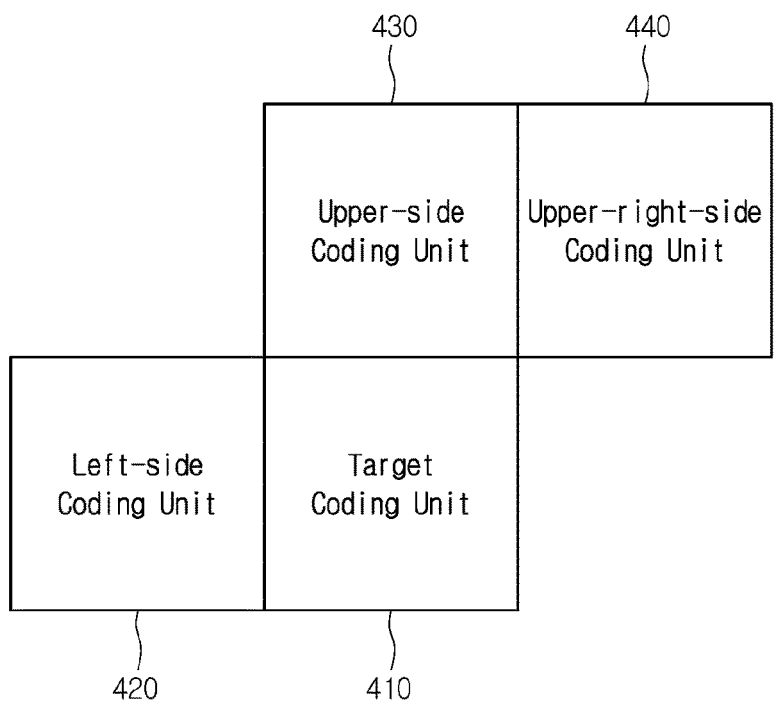
FIG. 4 illustrates a target coding unit and surrounding coding units that are used while the compressor and the decompressor of the encoding apparatus select the prediction method in accordance with an embodiment of the present invention.

FIG. 3 illustrates how the compressor and the decompressor of the encoding apparatus select a prediction method in accordance with an embodiment of the present invention, and FIG. 4 illustrates a target coding unit and surrounding coding units that are used while the compressor and the decompressor of the encoding apparatus select the prediction method in accordance with an embodiment of the present invention. Although the steps described below are performed by the compressor or the decompressor, it will be described that the steps are performed collectively by the encoding apparatus, for the convenience of description and understanding of the present invention.

In step 310, the encoding apparatus determines whether depth information of surrounding coding units of a coding unit (referred to as "target coding unit" hereinafter) that is a target for which a prediction method is to be selected is all zero (0). That is, referring to FIG. 4, a target coding unit 410 may have 3 surrounding coding units. For example, the surrounding coding units includes a left-side coding unit 420, which is a coding unit adjacent to the target coding unit 410 on a left side thereof, an upper-side coding unit 430, which is a coding unit adjacent to the target coding unit 410 on an upper side thereof, and an upper-left-side coding unit 440, which is a coding unit adjacent to the target coding unit 410 on an upper left side thereof.

In case the depth information of all of the surrounding coding units is 0 in step 310, the encoding apparatus performs prediction for each pixel included in the target coding unit through a first prediction method in step 320. The first prediction method will be described later in detail with reference to FIG. 5.

In case the depth information of none of the surrounding coding units is 0 in step 310, the coding apparatus determines in step 330 whether the depth information of all of the surrounding coding units is 1.

In case the depth information of all of the surrounding coding units is 1 in step 330, the encoding apparatus performs prediction for each pixel included in the target coding unit through a second prediction method in step 340. The second prediction method will be described later in detail with reference to FIG. 6.

In case the depth information of not all of the surrounding coding units is 1 in step 330, the encoding apparatus performs prediction for each pixel included in the target coding unit through a third prediction method in step 350. The third prediction method will be described later in detail with reference to FIG. 7.

Figure 5:
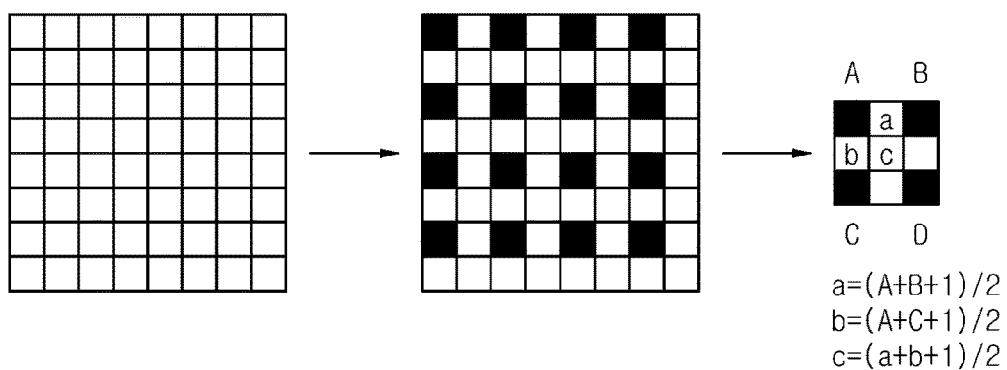
FIG. 5 illustrates a first prediction method performed by the encoding apparatus in accordance with an embodiment of the present invention.

FIG. 5 illustrates the first prediction method performed by the encoding apparatus in accordance with an embodiment of the present invention.

Referring to FIG. 5, the first prediction method is performed through a 4:1 sampling. Specifically, when the target coding unit is divided into 2×2 blocks, the compressor 220 performs compression by deleting pixels except the upper left pixel in each block. Hereinafter, the pixels that are not deleted will be referred to as "remaining pixels," and the pixels that are deleted will be referred to as "deleted pixels." That is, in FIG. 5, values of pixels, excluding the black pixels, are deleted. Here, the compression ratio of the first prediction method is 75%.

In the first prediction method used for decoding by the decompressor 270, the remaining pixels are referenced to predict the value of the deleted pixel. That is, in case the pixels adjacent to the deleted pixel on the left and right sides or upper and lower sides thereof are remaining pixels, the value of the deleted pixel is predicted by adding 1 to the values of the remaining pixels and dividing this sum into 2. For example, the decompressor 270 may predict (A+B+1)/2 as pixel "a" according to the adjacent remaining pixels of A and B. Moreover, the decompressor 270 may predict (A+C+1)/2 as pixel "b" according to the adjacent remaining pixels A and C.

In case the pixels adjacent to a deleted pixel on the upper and left sides thereof are deleted pixels, the decompressor 270 may predict the value of the deleted pixel by adding 1 to the values of the deleted pixels on the upper and left sides and dividing this sum into 2. Here, the decompressor 270 may be configured to predict the deleted pixel of the upper most row first and then predict the deleted pixel of the left side.

FIG. 6 illustrates the second prediction method performed by the encoding apparatus in accordance with an embodiment of the present invention.

Referring to FIG. 6, the second prediction method is performed through a 2:1 sampling. Specifically, when the target coding unit is divided into 2×2 blocks, the compressor 220 performs compression by deleting pixels except the upper left pixel and the upper right pixel in each block. Here, the compression ratio of the second prediction method is 50%.

In the second prediction method used for decoding by the decompressor 270, the value of the deleted pixel is predicted according to the remaining pixels. That is, the value of the deleted pixel is predicted by adding 1 to the values of the remaining pixels adjacent to the deleted pixel on the upper and lower sides thereof and dividing this sum into 2. For example, the decompressor 270 may predict (A+D+1)/2 as pixel "a" according to the remaining pixels of A and D that are adjacent to the deleted pixel "a." Moreover, the decompressor 270 may predict (B+D+1)/2 as pixel "b" according to the remaining pixels B and E that are adjacent to the deleted pixel "b." Moreover, the decompressor 270 may predict (C+F+1)/2 as pixel "c" according to the remaining pixels C and F that are adjacent to the deleted pixel "c."

FIG. 7 illustrates the third prediction method performed by the encoding apparatus in accordance with an embodiment of the present invention.

Referring to FIG. 7, the third prediction method is performed through a 4:3 sampling. Specifically, when the target coding unit is divided into 2×2 blocks, the compressor 220 performs compression by deleting the lower right pixel and setting aside the rest of the pixels in each block. Here, the compression ratio of the third prediction method is 25%.

In the third prediction method used for decoding by the decompressor 270, the value of the deleted pixel is predicted according to the remaining pixels. That is, the value of the deleted pixel is predicted by taking a median value of the remaining pixels adjacent to the deleted pixel on the left, upper and upper left sides thereof. For example, the decompressor 270 may predict the median value of the remaining pixels of A, B and C as the value of pixel "a."

Figure 8:
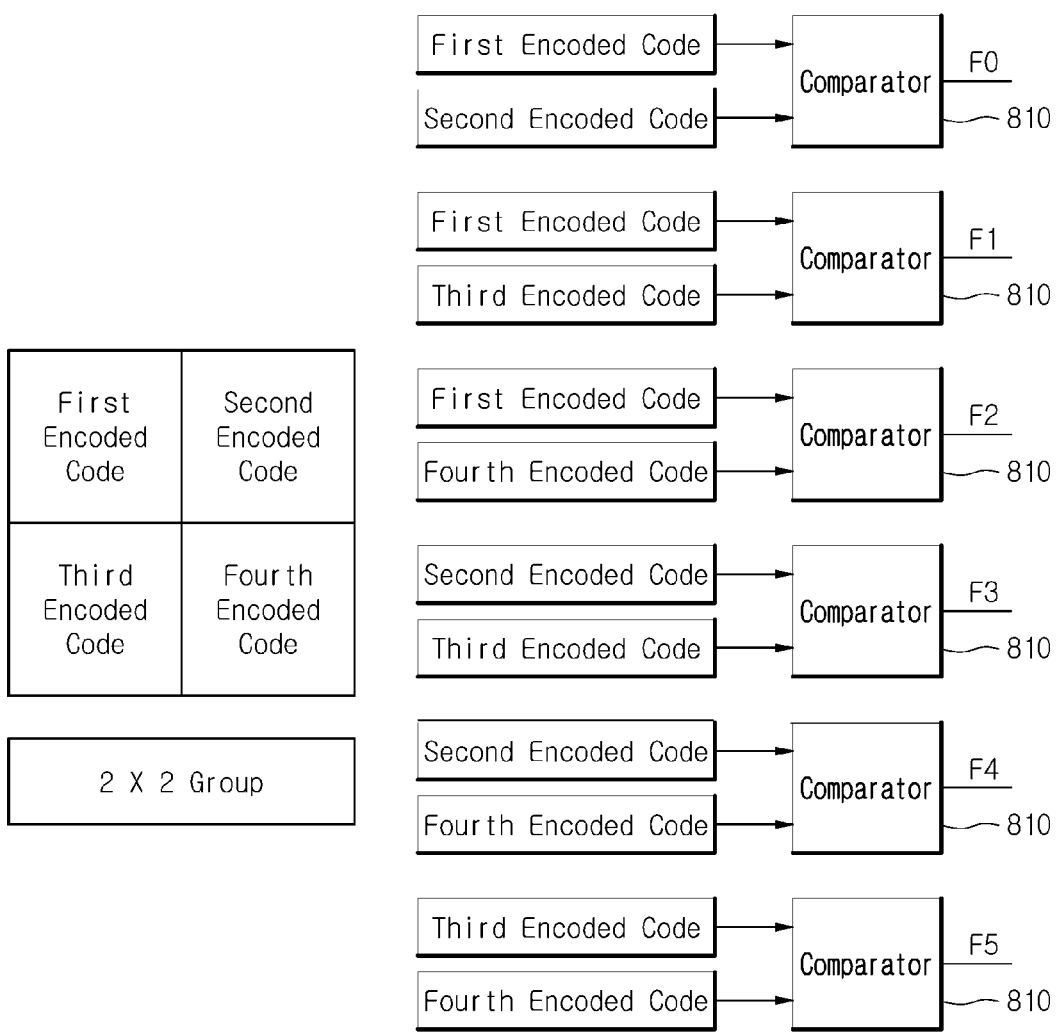
FIG. 8 illustrates a duplicate data encoder of the encoding apparatus in accordance with an embodiment of the present invention.
Figure 9:
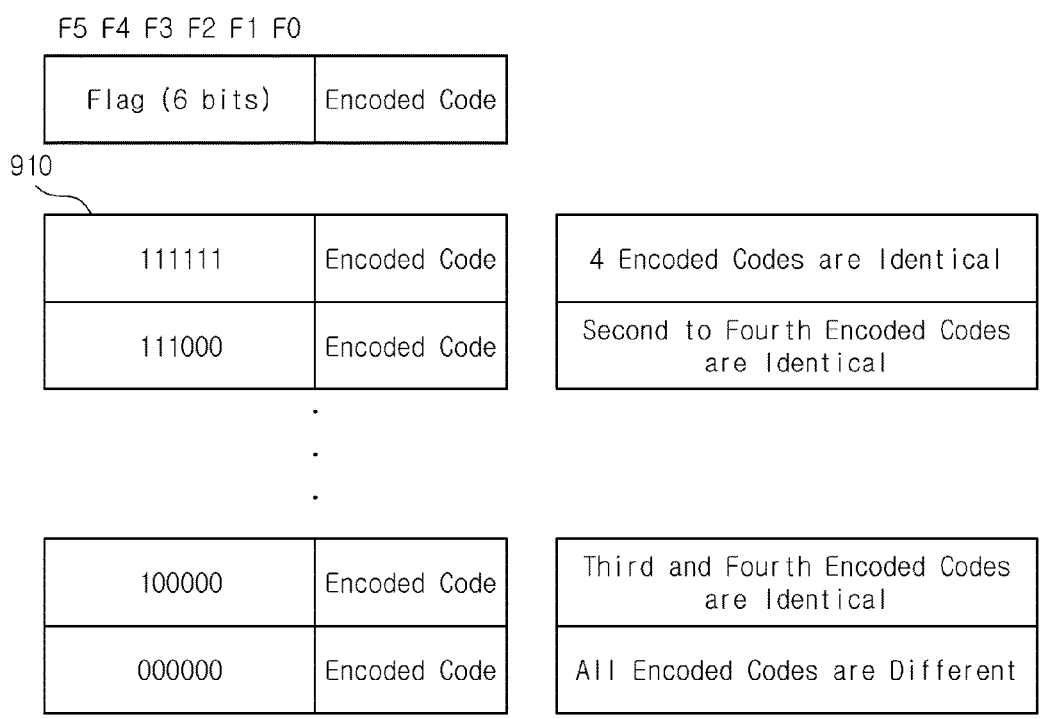
FIG. 9 illustrates a duplicate removed code generated by the duplicate data encoder of the encoding apparatus in accordance with an embodiment of the present invention.

FIG. 8 illustrates the duplicate data encoder of the encoding apparatus in accordance with an embodiment of the present invention, and FIG. 9 illustrates the duplicate removed code generated by the duplicate data encoder of the encoding apparatus in accordance with an embodiment of the present invention.

Referring to FIG. 8, the duplicate data encoder 230 includes at least one comparator 810 configured to determine identicalness of the encoded codes received from the compressor 220.

For example, the duplicate data encoder 230 may sort the encoded codes in groups of 2×2 encoded codes according to the positions of pixels corresponding to the encoded codes, and the identicalness of the encoded codes included in each group may be determined through the comparator 810. Hereinafter, for the convenience of description, the encoded code on the upper left side in a 2×2 group will be referred to as a first encoded code, the encoded code on the upper right side as a second encoded code, the encoded code on the lower left side as a third encoded code, and the encoded code on the lower right side as a fourth encoded code. Here, in case the encoded codes are generated through the first prediction method and the second prediction method, the remaining pixels of each frame may be rearranged to be adjacent to one another in such a way that 4 encoded codes of the 2×2 remaining pixels are sorted as one group. Moreover, in case the encoded codes are generated through the third prediction method, the fourth encoded code shown in FIG. 8 is configured to be not present in such a way that the first to third encoded codes (e.g., encoded codes of pixels A, B and C shown in FIG. 7) are sorted as one group.

That is, when the 2×2 group is defined as shown in FIG. 8, the duplicate data encoder 230 may determine the identicalness of the encodes codes included in the group through the comparator 810. Here, each of the comparators 810 outputs a flag indicating the identicalness of the encoded codes with one another.

The duplicate data encoder 230 generates a 6-bit flag by combining the flags outputted by the comparators 810 (for example, F0, F1, F2, F3, F4 and F5 shown in FIG. 8) in a predetermined order (for example, the order of F5, F4, F3, F2, F1 and F0) and generates a duplicate removed code by combining one of the identical encoded codes within the single 2×2 group, un-identical encoded code(s) within the single 2×2 group and the flag. Here, the comparator 810 may output a flag bit having a value of 1 if two inputted encoded codes are identical with each other, and may output a flag bit having a value of 0 if two inputted encoded codes are different from each other. For example, in case the flags are all 1, as represented by reference numeral 910 in FIG. 9, all of the encoded codes within the 2×2 group are identical with one another, and thus the duplicate data encoder 230 may generate the duplicate removed code having a flag "111111" and one encoded code included therein. In the case where the flag is "111000," the duplicate data encoder 230 may confirm that the first encoded code is different from the second to fourth encoded codes, based on the fact that the last three flags are "0." Therefore, the duplicate data encoder 110 may combine one of the second to fourth encoded codes and the first encoded code in the duplicate removed code. Here, in case the encoded codes are generated through the third prediction method, the value of the fourth encoded codes does not exist, and thus no flag is outputted through the comparator 810 to which the fourth encoded code is inputted. Accordingly, the duplicate data encoder 230 may generate a flag consisting of 3 bits (e.g., F0, F1 and F3).

The duplicate data decoder 260 may perform decoding of assigning one or more encoded codes included in the duplicate removed code as the encoded code of each pixel corresponding to the 2×2 group according to each flag of the duplicate removed code. For example, in case a duplicate removed code including flag "111111" and encoded codes is received, the duplicate data decoder 260 may confirm that the encoded codes of all pixels corresponding to the 2×2 group are identical with one another according to the flag "111111" and set one of the encoded codes included in the duplicate removed code as the encoded code of all pixels corresponding to the 2×2 group.

Figure 10:
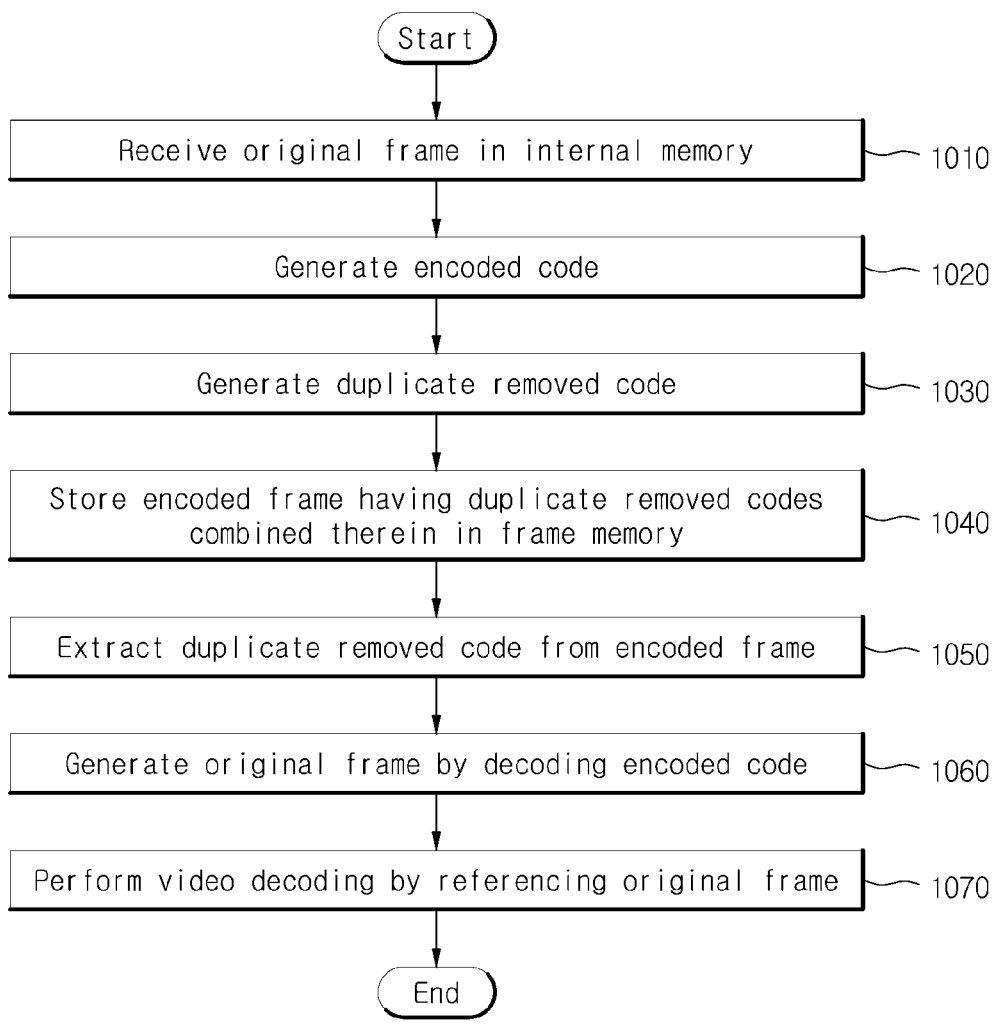
FIG. 10 is a flow diagram illustrating how the encoding apparatus in accordance with an embodiment of the present invention performs video encoding.

FIG. 10 is a flow diagram illustrating how the encoding apparatus in accordance with an embodiment of the present invention performs video encoding. Although the steps described below are performed by their respective functional units constituting the encoding apparatus, it will be described that the steps are performed collectively by the encoding apparatus, for the convenience of description and understanding of the present invention.

Referring to FIG. 10, in step 1010, the encoding apparatus receives an original frame in the internal memory.

In step 1020, the encoding apparatus generates an encoded code by encoding the original frame according to the first to third prediction methods. Here, the steps for encoding the recorded frame according to each of the prediction methods have been described above.

In step 1030, the encoding apparatus generates a duplicate removed code according to each encoded code.

In step 1040, the encoding apparatus generates an encoded frame by combining duplicate removed codes and stores the encoded frame in the frame memory.

In step 1050, the encoding apparatus extract the duplicate removed code from the encoded frame, as referencing the encoded frame stored in the frame memory is required during encoding.

In step 1060, the encoding apparatus generates an original frame by decoding the encoded code.

In step 1070, the encoding apparatus performs video decoding by referencing the original frame according to a predetermined method.

While the present invention has been described with reference to certain embodiments, the embodiments are for illustrative purposes only and shall not limit the invention. It is to be appreciated that those skilled in the art can change or modify the embodiments without departing from the scope and spirit of the invention.

What is claimed is:

1. An encoding apparatus, comprising:
   an encoder configured to request for encoding of an original frame;
   a frame processing unit configured to encode the original frame and to generate an encoded frame; and
   a frame memory configured to store the encoded frame, wherein the frame processing unit is configured to generate the original frame by decoding the encoded frame stored in the frame memory according to a request of the encoder, and comprises:
   an internal memory configured to store the original frame;
   a compressor configured to generate encoded codes by encoding the original frame;
   a duplicate data encoder configured to generate duplicate removed codes by removing duplicate encoded codes among the encoded codes;
   a packer configured to generate the encoded frame based on the duplicate removed codes and store the encoded frame in the frame memory;
   an unpacker configured to receive the encoded frame from the frame memory and extract the duplicate removed codes included in the encoded frame;
   a duplicate data decoder configured to generate the encoded codes by converting the duplicate removed codes; and
   a decompressor configured to generate the original frame by decoding the encoded codes and store the original frame in the internal memory.

2. The encoding apparatus of claim 1, wherein the compressor is configured to select a prediction method of a target coding unit according to depth information of surrounding coding units of the original frame, and
   wherein the compressor is configured to encode pixels included in the target coding unit according to the prediction method.

3. The encoding apparatus of claim 2, wherein the compressor is configured to encode each pixel included in the target coding unit through a first prediction method in case the depth information of all of the surrounding coding units is 0,
   wherein the encoding according to the first prediction method is performed by deleting pixels except upper left pixels in each block when the target coding unit is divided into 2×2 blocks,
   wherein the decompressor is configured to decode each pixel included in the target coding unit through the first prediction method in case the depth information of all of the surrounding coding units is 0,
   wherein, in case pixels adjacent to the deleted pixel on the left and right sides or upper and lower sides thereof are remaining pixels, the decoding according to the first prediction method is performed by adding 1 to values of the remaining pixels and dividing this sum into 2, and
   wherein, in case pixels adjacent to each deleted pixel on the upper and left sides thereof are deleted pixels, the decoding according to the first prediction method is performed by adding 1 to values of the deleted pixels on the upper and left sides and dividing this sum into 2.

4. The encoding apparatus of claim 2, wherein the compressor is configured to encode each pixel included in the target coding unit through a second prediction method in case the depth information of all of the surrounding coding units is 1,
   wherein the encoding according to the second prediction method is performed by deleting pixels except upper left pixels and upper right pixels in each block when the target coding unit is divided into 2×2 blocks,
   wherein the decompressor is configured to decode each pixel included in the target coding unit through the second prediction method in case the depth information of all of the surrounding coding units is 1, and
   wherein, the decoding according to the second prediction method is performed by adding 1 to values of pixels adjacent to the deleted pixels on the upper and lower sides thereof and dividing this sum into 2.

5. The encoding apparatus of claim 2, wherein the compressor is configured to encode each pixel included in the target coding unit through a third prediction method in case the depth information of not all of the surrounding coding units is 0 or the depth information of not all of the surrounding coding units is 1,
   wherein the encoding according to the third prediction method is performed by deleting a lower right pixel of each block when the target coding unit is divided into 2×2 blocks,
   wherein the decompressor is configured to decode each pixel included in the target coding unit through the third prediction method in case the depth information of not all of the surrounding coding units is 0 or the depth information of not all of the surrounding coding units is 1, and
   wherein the decoding according to the third prediction method is performed by taking a median value of remaining pixels adjacent to the deleted pixel on the left, upper and upper left sides thereof.

6. The encoding apparatus of claim 1, wherein the duplicate data encoder is configured to sort the encoded code into a 2×2 group according to a position of a pixel corresponding to the encoded code,
   wherein the duplicate data encoder comprises a comparator configured to output a flag indicating an identicalness between encoded codes included in the group, and
   wherein the duplicate data encoder is configured to generate the duplicate removed code by combining one of identical encoded codes within the group, un-identical encoded code(s) within the group and the flag.

7. The encoding apparatus of claim 6, wherein the duplicate data decoder is configured to assign each encoded code included in the duplicate removed code to a pixel corresponding to the group according to the flag of the duplicate removed code.

8. A method for encoding a video by an encoding apparatus, comprising:
   receiving an original frame into an internal memory;
   generating an encoded frame by encoding the original frame including
      generating encoded codes by encoding the original frame;
      generating duplicate removed codes by removing duplicate encoded codes among the encoded codes; and generating the encoded frame based on the duplicate removed codes and storing the encoded frame in a frame memory;

storing the original frame in the frame memory; and generating the original frame by decoding the encoded frame stored in the frame memory, including extracting the duplicate removed codes included in the encoded frame stored in the frame memory;

generating the encoded codes by converting the duplicate removed codes; and generating the original frame by decoding the encoded codes.

9. The method of claim 8, wherein the generating of the original frame by decoding the encoded codes comprises:

selecting a prediction method of a target coding unit according to depth information of surrounding coding units of the original frame; and encoding pixels included in the target coding unit according to the prediction method.

10. The method of claim 9, wherein, in the selecting of a prediction method of a target coding unit according to depth information of surrounding coding units of the original frame, each pixel included in the target coding unit is encoded through a first prediction method in case the depth information of all of the surrounding coding units is 0, wherein the encoding according to the first prediction method is performed by deleting pixels except upper left pixels in each block when the target coding unit is divided into 2×2 blocks, wherein, in the generating of the original frame by decoding the encoded codes, each pixel included in the target coding unit is decoded through the first prediction method in case the depth information of all of the surrounding coding units is 0, wherein, in case pixels adjacent to the deleted pixel on the left and right sides or upper and lower sides thereof are remaining pixels, the decoding according to the first prediction method is performed by adding 1 to values of the remaining pixels and dividing this sum into 2, and wherein, in case pixels adjacent to each deleted pixel on the upper and left sides thereof are deleted pixels, the decoding according to the first prediction method is performed by adding 1 to values of the deleted pixels on the upper and left sides and dividing this sum into 2.

11. The method of claim 9, wherein, in the selecting of a prediction method of a target coding unit according to depth information of surrounding coding units of the original frame, each pixel included in the target coding unit is encoded through a second prediction method in case the depth information of all of the surrounding coding units is 1, wherein the encoding according to the second prediction method is performed by deleting pixels except upper left pixels and upper right pixels in each block when the target coding unit is divided into 2×2 blocks, wherein, in the generating of the original frame by decoding the encoded codes, each pixel included in the target coding unit is decoded through the second prediction method in case the depth information of all of the surrounding coding units is 1, and wherein, the decoding according to the second prediction method is performed by adding 1 to values of pixels adjacent to the deleted pixels on the upper and lower sides thereof and dividing this sum into 2.

12. The method of claim 9, wherein, in the selecting of a prediction method of a target coding unit according to depth information of surrounding coding units of the original frame, each pixel included in the target coding unit is encoded through a third prediction method in case the depth information of not all of the surrounding coding units is 0 or the depth information of not all of the surrounding coding units is 1, wherein the encoding according to the third prediction method is performed by deleting a lower right pixel of each block when the target coding unit is divided into 2×2 blocks, wherein, in the generating of the original frame by decoding the encoded codes, each pixel included in the target coding unit is decoded through the third prediction method in the depth information of not all of the surrounding coding units is 0 or the depth information of not all of the surrounding coding units is 1, and wherein the decoding according to the third prediction method is performed by taking a median value of remaining pixels adjacent to the deleted pixel on the left, upper and upper left sides thereof.

13. The method of claim 8, wherein the generating of the duplicate removed codes by removing the duplicate encoded codes among the encoded codes comprises:

sorting the encoded code into a 2×2 group according to a position of a pixel corresponding to the encoded code, and generating a flag indicating an identicalness between encoded codes included in the group; and generating the duplicate removed code by combining one of identical encoded codes within the group, un-identical encoded code(s) within the group and the flag.

14. The method of claim 13, wherein, in the generating of the encoded codes by converting the duplicate removed codes, each encoded code included in the duplicate removed code is assigned to a pixel corresponding to the group according the flag of the duplicate removed code.

* * * * *